United States Patent
Kline et al.

(10) Patent No.: US 11,183,186 B2
(45) Date of Patent: Nov. 23, 2021

(54) OPERATING A VOICE RESPONSE SYSTEM

(71) Applicant: INTERNATIONAL BUSINESS MACHINES CORPORATION, Armonk, NY (US)

(72) Inventors: Eric V. Kline, Rochester, MN (US); Richard Burton Finch, New Paltz, NY (US); Sarbajit K. Rakshit, Kolkata (IN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 38 days.

(21) Appl. No.: 16/248,977

(22) Filed: Jan. 16, 2019

(65) Prior Publication Data
US 2020/0227037 A1    Jul. 16, 2020

(51) Int. Cl.
*G10L 15/22* (2006.01)
*G10L 15/30* (2013.01)

(52) U.S. Cl.
CPC .............. *G10L 15/22* (2013.01); *G10L 15/30* (2013.01); *G10L 2015/223* (2013.01)

(58) Field of Classification Search
CPC ................................. G10L 15/22; G10L 15/30
See application file for complete search history.

(56) References Cited

U.S. PATENT DOCUMENTS

| | | | |
|---|---|---|---|
| 5,340,317 A * | 8/1994 | Freeman | G09B 5/04 434/319 |
| 6,745,193 B1 | 6/2004 | Horvitz et al. | |
| 7,212,969 B1 | 5/2007 | Bennett | |
| 8,069,131 B1 * | 11/2011 | Luechtefeld | G06Q 10/10 706/47 |
| 8,296,383 B2 | 10/2012 | Lindahl | |
| 8,781,094 B2 | 7/2014 | Ramanathan et al. | |
| 8,942,986 B2 | 1/2015 | Cheyer et al. | |
| 9,112,931 B1 * | 8/2015 | Morrison | H04L 51/02 |
| 9,148,741 B2 | 9/2015 | Gordon et al. | |
| 9,602,886 B2 | 3/2017 | Amidei et al. | |
| 9,847,084 B2 | 12/2017 | Gustafson et al. | |
| 10,026,400 B2 | 7/2018 | Gelfenbeyn et al. | |

(Continued)

OTHER PUBLICATIONS

Mell, Peter et al. "The NIST Definition of Cloud Computing", National Institute of Standards and Technology, U.S. Department of Commerce; Sep. 2011; 7 pgs.

(Continued)

*Primary Examiner* — Jakieda R Jackson
(74) *Attorney, Agent, or Firm* — Cantor Colburn LLP; Tihon Poltavets

(57) ABSTRACT

Methods, systems and computer program products for operating a voice response system are provided. Aspects include receiving, by the voice response system, a voice command from a first user and determining an operating mode of the voice response system. Aspects also include obtaining, by the voice response system, a response preference of the first user and determining a response to the voice command. The response is determined based at least in part on the response preference of the first user and the operating mode of the voice response system. Aspects also include providing the response to the first user.

16 Claims, 6 Drawing Sheets

(56) References Cited

U.S. PATENT DOCUMENTS

| | | | |
|---|---|---|---|
| 2004/0006483 A1* | 1/2004 | Sasaki | G10L 15/22 704/277 |
| 2004/0101154 A1* | 5/2004 | Maekawa | H04R 1/1091 381/380 |
| 2004/0162724 A1* | 8/2004 | Hill | G10L 15/1822 704/231 |
| 2004/0264652 A1* | 12/2004 | Erhart | G10L 15/26 379/88.01 |
| 2006/0282493 A1* | 12/2006 | Iwamura | G06Q 90/00 709/200 |
| 2008/0139178 A1* | 6/2008 | Kawasaki | H04M 1/6075 455/413 |
| 2008/0254419 A1* | 10/2008 | Cohen | G09B 5/06 434/219 |
| 2009/0193123 A1* | 7/2009 | Mitzlaff | G06F 16/24573 709/227 |
| 2009/0259472 A1* | 10/2009 | Schroeter | H04M 1/72527 704/260 |
| 2010/0316205 A1 | 12/2010 | Zheng et al. | |
| 2011/0200978 A1* | 8/2011 | Bergan | G09B 7/00 434/322 |
| 2011/0224870 A1* | 9/2011 | Tan | H04M 1/6091 701/36 |
| 2014/0100848 A1* | 4/2014 | Shaffer | G10L 15/22 704/240 |
| 2014/0108307 A1 | 4/2014 | Raghunathan et al. | |
| 2015/0276254 A1* | 10/2015 | Nemcek | G05D 23/1905 700/278 |
| 2015/0324698 A1 | 11/2015 | Karaoguz et al. | |
| 2015/0341005 A1 | 11/2015 | Talwar et al. | |
| 2016/0050221 A1* | 2/2016 | Myslinski | H04L 63/1408 726/22 |
| 2016/0171062 A1* | 6/2016 | Bufe | H04L 67/36 707/722 |
| 2017/0186425 A1* | 6/2017 | Dawes | G10L 15/222 |
| 2017/0244746 A1* | 8/2017 | Hawthorn | H04L 63/1408 |
| 2017/0330479 A1* | 11/2017 | Bowman | G09B 5/125 |
| 2018/0040020 A1 | 2/2018 | Kurian et al. | |
| 2018/0082184 A1 | 3/2018 | Guo et al. | |
| 2018/0096617 A1* | 4/2018 | Tapuhi | G06Q 10/0639 |
| 2018/0181854 A1 | 6/2018 | Koukoumidis et al. | |
| 2018/0189355 A1 | 7/2018 | Sandu et al. | |
| 2018/0196782 A1* | 7/2018 | Gray | G06F 3/0484 |
| 2018/0197542 A1 | 7/2018 | Herling et al. | |
| 2018/0218627 A1* | 8/2018 | Smith Lewis | G09B 7/04 |
| 2019/0180741 A1* | 6/2019 | Park | G10L 15/22 |
| 2019/0268460 A1* | 8/2019 | Agrawal | H04W 4/021 |
| 2020/0034492 A1* | 1/2020 | Verbeke | G06F 40/40 |
| 2020/0137014 A1* | 4/2020 | Kasireddy | H04L 51/16 |

OTHER PUBLICATIONS

Sun, Yu et al., "Collaborative Intent Prediction with Real-Time Contextual Data", ACM Transactions on Information Systems, vol. 1, No. 1, Article 1. Publication date: Jan. 2017; pp. 1:1-1:33.

Cram, Damien "An Approach to User-Centric Context-Aware Assistance based on Interaction Traces", University of Lyon, Villeurbanne, France; Mar. 2008; 17 pgs.

Shum, Heung-Yeung et al. "From Eliza to Xiaolce: Challenges and Opportunities with Social Chatbots", Microsoft Corporation, Frontiers of Information Technology & Electronic Engineering; Jan. 8, 2018, vol. 19, Issue 1; 20 pgs.

Sun, Ming et al. "Understanding User's Cross-Domain Intentions in Spoken Dialog Systems", School of Computer Science, Carnegie Mellon University; retrieved at: http://www.cs.cmu.edu/~mings/papers/nips15.pdf; downloaded Jun. 12, 2020; 7 pgs.

* cited by examiner

OPERATING A VOICE RESPONSE SYSTEM

BACKGROUND

The invention relates generally to voice response systems and, more specifically, to operating a voice response system.

Voice response systems are becoming ubiquitous and are currently used to control a wide variety of devices, such as televisions, personal assistants, home network devices, thermostats, entertainment systems, and the like. Voice response systems monitor the audio for a voice command and responsively perform an action indicated by the voice command or provide information to users in response to the voice commands.

SUMMARY

According to an embodiment, a system for operating a voice response system is provided. The system includes a memory having computer readable computer instructions, and a processor for executing the computer readable instructions. The computer-readable instructions include instructions for receiving, by the voice response system, a voice command from a first user and determining an operating mode of the voice response system. The computer-readable instructions also include instructions for obtaining, by the voice response system, a response preference of the first user, and determining a response to the voice command. The response is determined based at least in part on the response preference of the first user and the operating mode of the voice response system. The computer-readable instructions also include instructions for providing the response to the first user.

According to another embodiment, a method for operating a voice response system is provided. The method includes receiving, by the voice response system, a voice command from a first user and determining an operating mode of the voice response system. The method also includes obtaining, by the voice response system, a response preference of the first user and determining a response to the voice command. The response is determined based at least in part on the response preference of the first user and the operating mode of the voice response system. The method also includes providing the response to the first user.

According to a further embodiment, a computer program product is provided. The computer program product includes a computer readable storage medium having program instructions embodied therewith. The computer-readable storage medium is not a transitory signal per se. The program instructions are executable by a computer processor to cause the computer processor to perform a method. The method includes receiving, by the voice response system, a voice command from a first user and determining an operating mode of the voice response system. The method also includes obtaining, by the voice response system, a response preference of the first user and determining a response to the voice command. The response is determined based at least in part on the response preference of the first user and the operating mode of the voice response system. The method also includes providing the response to the first user.

Additional features and advantages are realized through the techniques of the invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings, in which:

DETAILED DESCRIPTION

Figure 1:
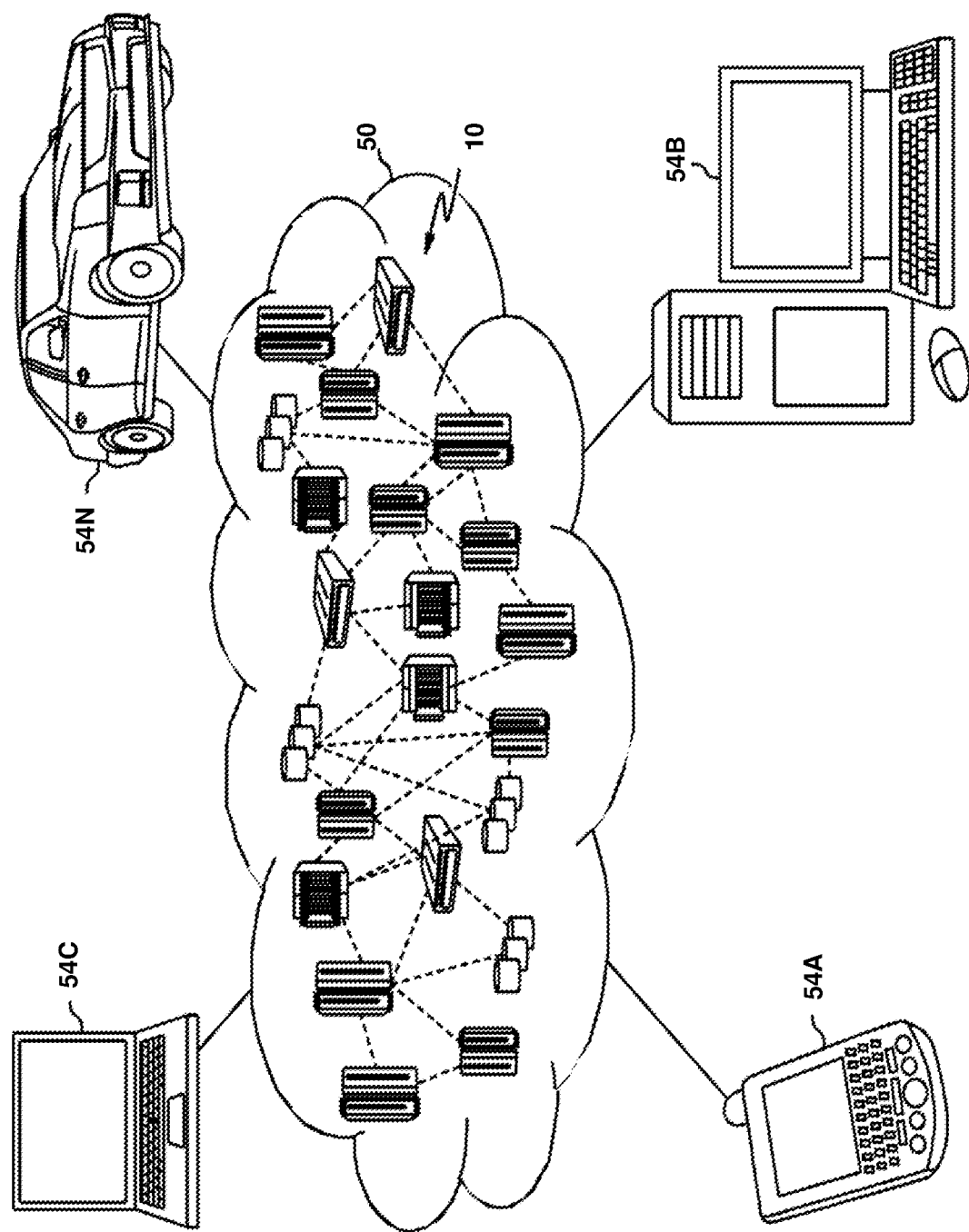
FIG. 1 depicts a cloud computing environment according to one or more embodiments of the present invention.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems; storage, deployed applications, and possibly limited control of select networking components (e.g., host firewalls).

Deployment Models are as follows:

Private cloud: the cloud infrastructure is operated solely for an organization. It may be managed by the organization or a third party and may exist, on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist, on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
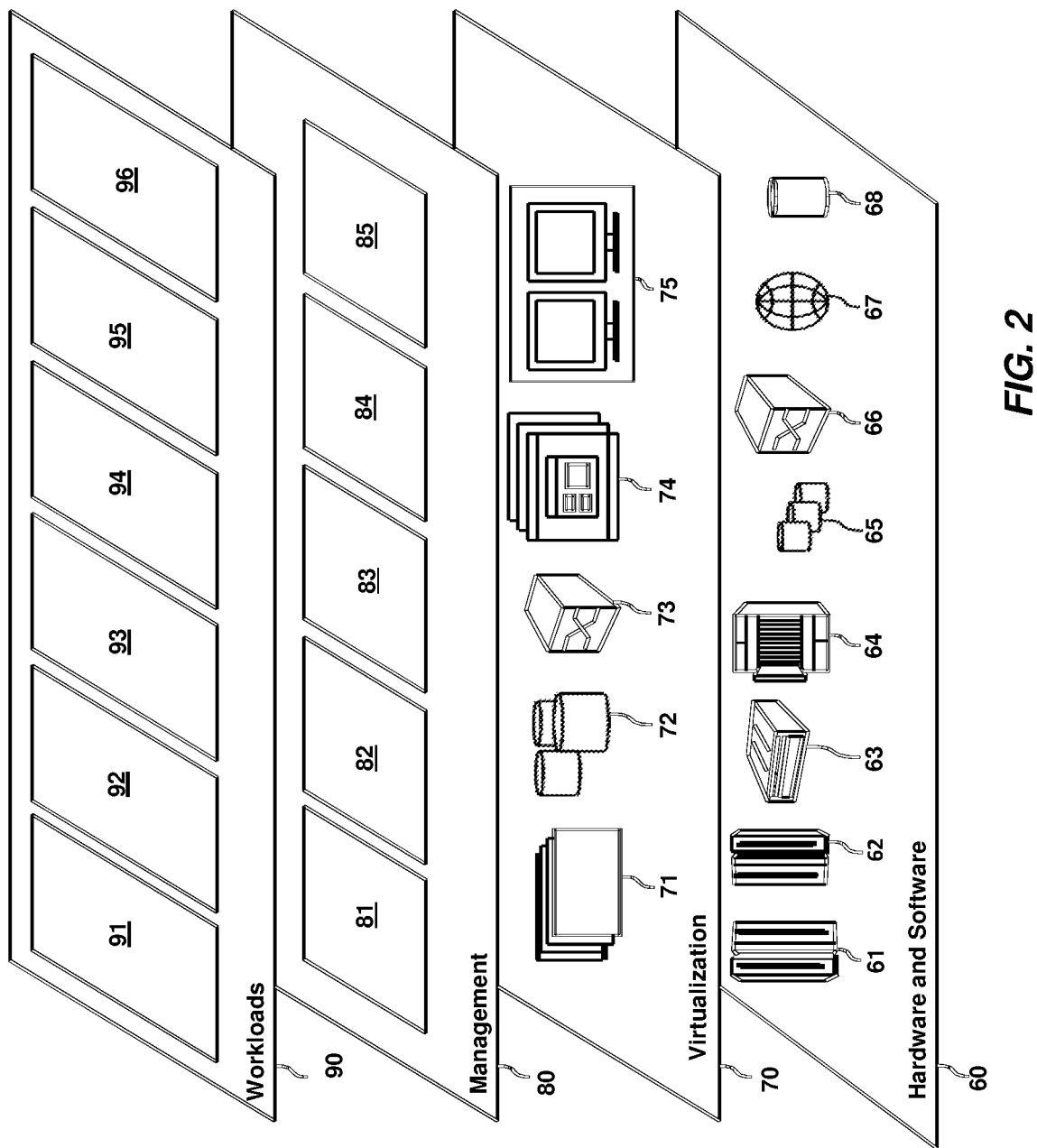
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and operating a voice response system 96.

Figure 3:
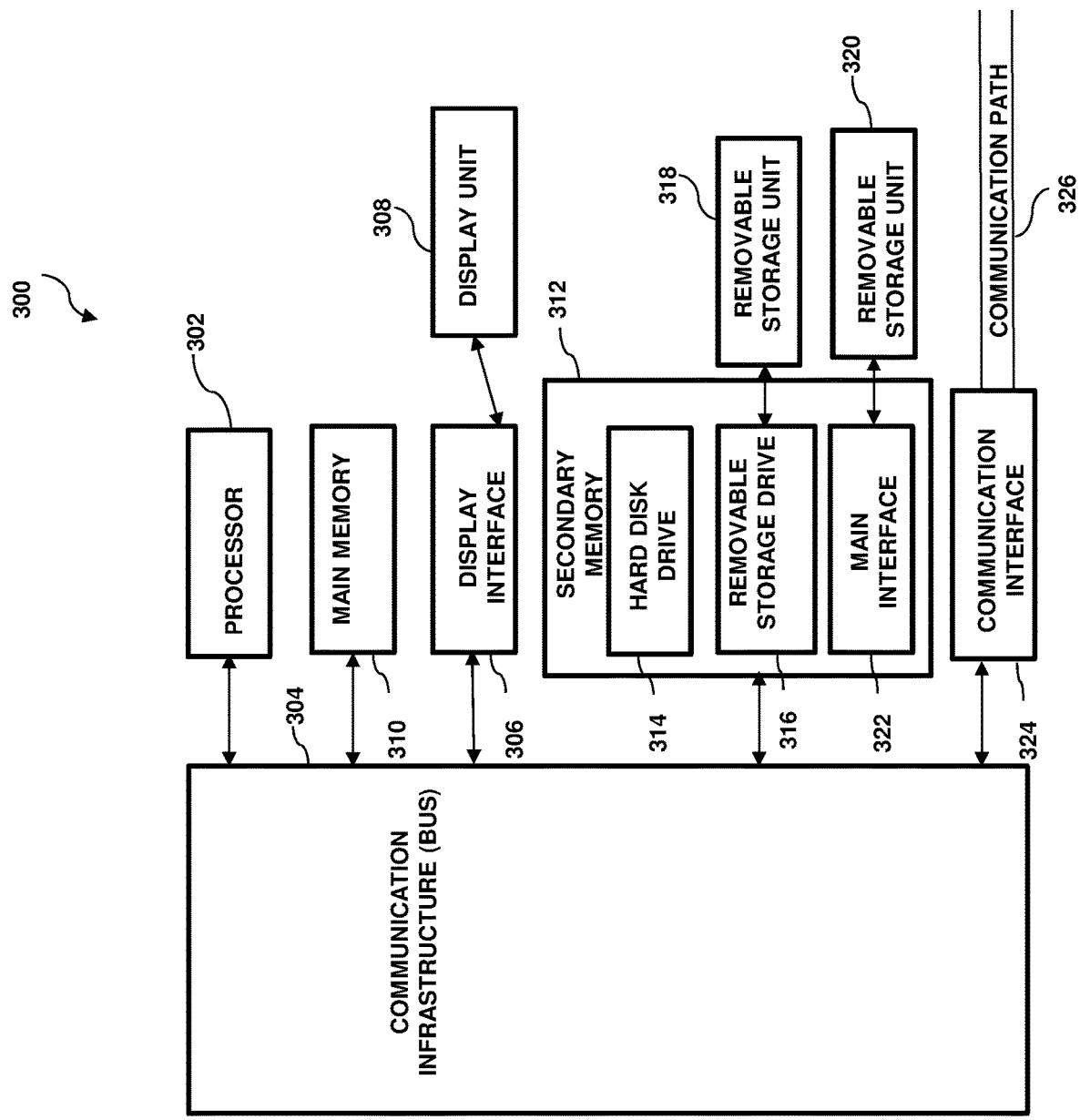
FIG. 3 depicts an exemplary computer system capable of implementing one or more embodiments of the present invention.

Turning now to a more detailed description of aspects of the present invention, FIG. 3 illustrates a high-level block diagram showing an example of a computer-based system 300 useful for implementing one or more embodiments of the invention. Although one exemplary computer system 300 is shown, computer system 300 includes a communication path 326, which connects computer system 300 to additional systems and may include one or more wide area networks (WANs) and/or local area networks (LANs) such as the internet, intranet(s), and/or wireless communication network(s). Computer system 300 and additional systems are in communication via communication path 326, (e.g., to communicate data between them).

Computer system 300 includes one or more processors, such as processor 302. Processor 302 is connected to a communication infrastructure 304 (e.g., a communications bus, cross-over bar, or network). Computer system 300 can include a display interface 306 that forwards graphics, text, and other data from communication infrastructure 304 (or from a frame buffer not shown) for display on a display unit 308. Computer system 300 also includes a main memory 310, preferably random access memory (RAM), and may also include a secondary memory 312. Secondary memory 312 may include, for example, a hard disk drive 314 and/or a removable storage drive 316, representing, for example, a floppy disk drive, a magnetic tape drive, or an optical disk drive. Removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc. which is read by and written to by a removable storage drive 316. As will be appreciated, removable storage unit 318 includes a computer readable medium having stored therein computer software and/or data.

In some alternative embodiments of the invention, secondary memory 312 may include other similar means for allowing computer programs or other instructions to be loaded into the computer system. Such means may include, for example, a removable storage unit 320 and an interface 322. Examples of such means may include a program package and package interface (such as that found in video game devices), a removable memory chip (such as an EPROM or PROM) and associated socket, and other removable storage units 320 and interfaces 322 which allow software and data to be transferred from the removable storage unit 320 to computer system 300.

Computer system 300 may also include a communications interface 324. Communications interface 324 allows software and data to be transferred between the computer system and external devices. Examples of communications interface 324 may include a modem, a network interface (such as an Ethernet card), a communications port, or a PCM-CIA slot and card, etc. Software and data transferred via communications interface 324 are in the form of signals which may be, for example, electronic, electromagnetic, optical, or other signals capable of being received by communications interface 324. These signals are provided to communications interface 324 via communication path (i.e., channel) 326. Communication path 326 carries signals and may be implemented using wire or cable, fiber optics, a phone line, a cellular phone link, an RF link, and/or other communications channels.

In the present disclosure, the terms "computer program medium," "computer usable medium," and "computer readable medium" are used to generally refer to media such as main memory 310 and secondary memory 312, removable storage drive 316, and a hard disk installed in hard disk drive 314. Computer programs (also called computer control logic) are stored in main memory 310, and/or secondary memory 312. Computer programs may also be received via communications interface 324. Such computer programs, when run, enable the computer system to perform the features of the present disclosure as discussed herein. In particular, the computer programs, when run, enable processor 302 to perform the features of the computer system. Accordingly, such computer programs represent controllers of the computer system.

In exemplary embodiments, a system for operating a voice response system is provided. In exemplary embodiments, a voice response system is configured to receive a voice command from a user and to provide a response to the voice command. The response to the voice command is determined based upon an operating mode of the voice response system and based upon response preferences for the user that provided the voice command. In exemplary embodiments, the operating mode of the voice response system is determined based on a number of individuals within range of the voice response system, the identity of the individuals within range of the voice response system and/or a monitored interaction between the individuals within range of the voice response system.

In one example, the voice response system operates in a first operating mode based on a determination that a single person is within range of the voice response system. In the first operating mode, the voice response system is configured to provide a response to a voice command via a speaker of the voice response system upon receiving the voice command, i.e., without interposing any delay.

In another example, the voice response system operates in a second operating mode based on a determination that two or more people are within range of the voice response system and that the two or more people are having a conversation with one another. In the second operating mode, the voice response system is configured to provide a response to the voice command only after determining that one of the two or more people did not already provide a response to the voice command during a period of time after the voice command was received. In exemplary embodiments, the voice response system can determine an accuracy of a user-provided response and take subsequent actions based on the determined accuracy of the user provided response. For example, two users are having a conversation within range of the voice response system and one of the two users asks the other what the score of a baseball game from yesterday was. If the second user provides an accurate answer to the question within a time period, the voice response system takes no action. However, if the second user provides an inaccurate answer to the question within a time period, the voice response system can either provide the correct answer via a speaker or send the correct answer to a mobile device associated with the first user, depending upon the response preferences of the first user.

Figure 4:
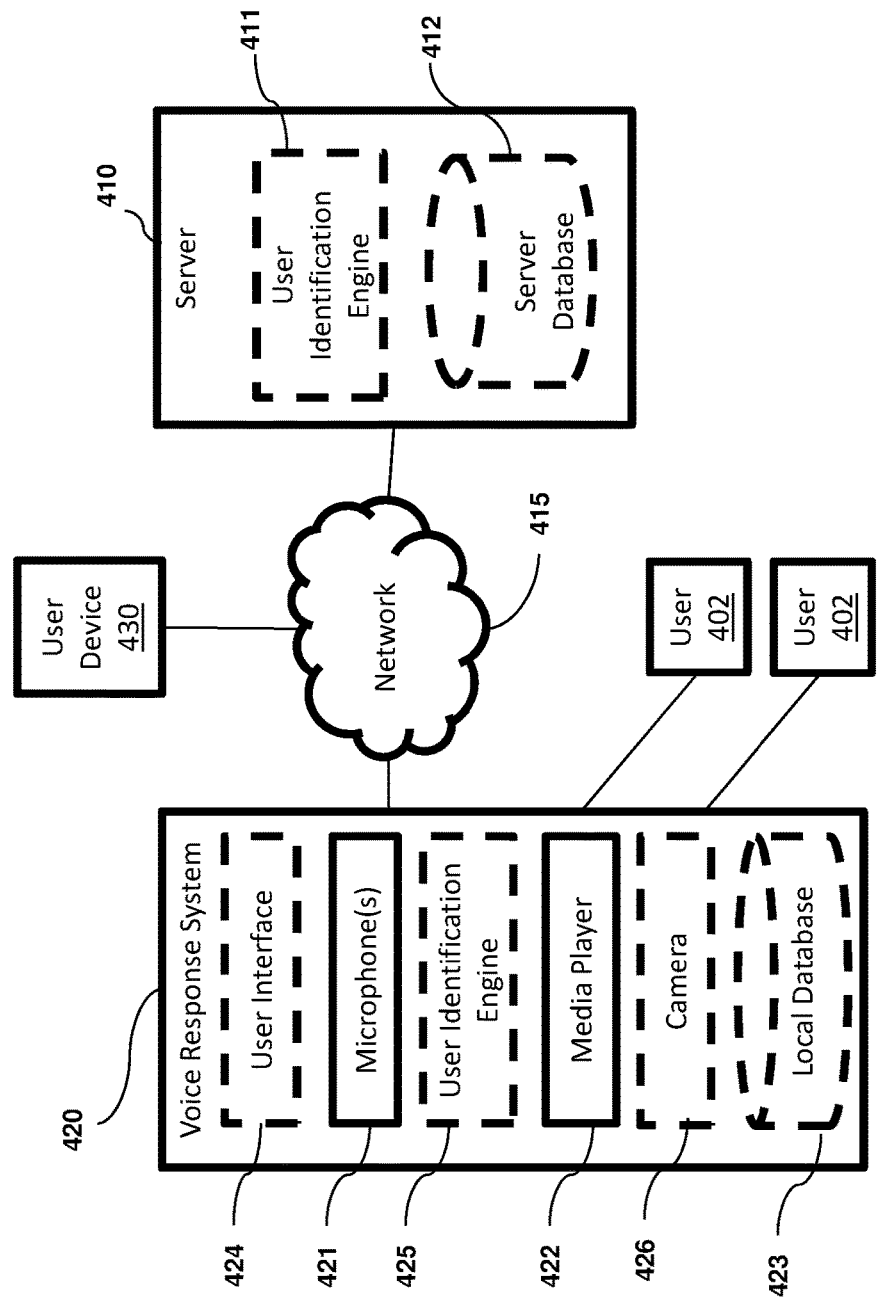
FIG. 4 depicts a system upon which operating a voice response system in a multiuser environment may be implemented according to one or more embodiments of the present invention.

Turning now to FIG. 4, a system 400 upon which operating a voice response system may be implemented will now be described in accordance with an embodiment. The system 400 shown in FIG. 4 includes a server 410 in communication with a voice response system 420 and a user device 430 via a communications network 415. The communications network 415 may be one or more of, or a combination of, public (e.g., Internet), private (e.g., local area network, wide area network, virtual private network), and may include wireless and wireline transmission systems (e.g., satellite, cellular network, terrestrial networks, etc.). The voice response system 420 is configured to receive voice commands from one or more users 402 in range of the voice response system 420. The user device 430 can be a smartphone, smartwatch or another personal electronic device that is associated with a user.

In exemplary embodiments, the voice response system 420 can be a smartphone, a tablet, a computer system such as the one shown in FIG. 3, a smart speaker, a television, or any other suitable electronic device. The voice response system 420 includes microphones 421 and a media player 422 capable of playing a media item. Optionally, the voice response system 420 can also include a local database 423, a user interface 424, a user identification engine 425, and a camera 426. The microphones 421 are used to detect voice commands for the voice response system 420 and the media player 422 is used responsively play a media items in response to the voice commands. The media item may be audio and/or video content.

In exemplary embodiments, the local database 423 is configured to store response preferences for a user. In addition, the local database 423 is configured to store the voice samples and/or images of authorized users of the voice response system 420. The user identification engine 425 can include a voice recognition engine that is configured to compare received voice commands to stored voice samples in the local database 423. Likewise, the user identification engine 425 can include a facial recognition engine that is configured to compare images, which are captured by the camera 426, of users to stored images in the local database 423. The user interface 424 can be a graphical user interface such as a touchscreen, a keyboard, or the like that can be used to create a command hierarchy. In exemplary embodiments, the command hierarchy can be stored in the local database 423.

In various embodiments, the response preferences, voice samples and/or images of authorized users of the voice response system 420 can be stored in the local database 423 and/or the server database 412. Likewise, the identification of a user can be performed by the user identification engine 425 of the voice response system 420 or by the user identification engine 411 of the server 410. The server 410 can be implemented as a computer system such as the one shown in FIG. 3 or as a cloud-based system such as the one shown in FIGS. 1 & 2. In embodiments where the server 410 is configured to perform user identification and to store audio files and images of the authorized users, the voice response system 420 is configured to capture audio files and/or images of the users and to transmit them to the server 410. In exemplary embodiments, machine learning can be used to create the response preferences based on biometric and visual recognition of the users.

In exemplary embodiments, the response preferences of a user are configured to control when and how a response to a voice command is provided to the user. In general, responses can be provided to the user in a variety of manners that include, but are not limited to, an audible response played via a speaker of the voice response system at various volume levels, a text message sent to a personal electronic device of a user, an email sent to the user, or other suitable means. In exemplary embodiments, the operating mode of the voice response system is also used to determine when and how a response to a voice command is provided to the user. The operating mode of the voice response system is determined based on one or more of a number of individuals within range of the voice response system, an identity of the individuals within range of the voice response system and an interaction between the individuals within range of the voice response system. In exemplary embodiments, the response preferences and operating mode of the voice response system are configured to control a level of detail of information that is provided in the response.

Figure 5:
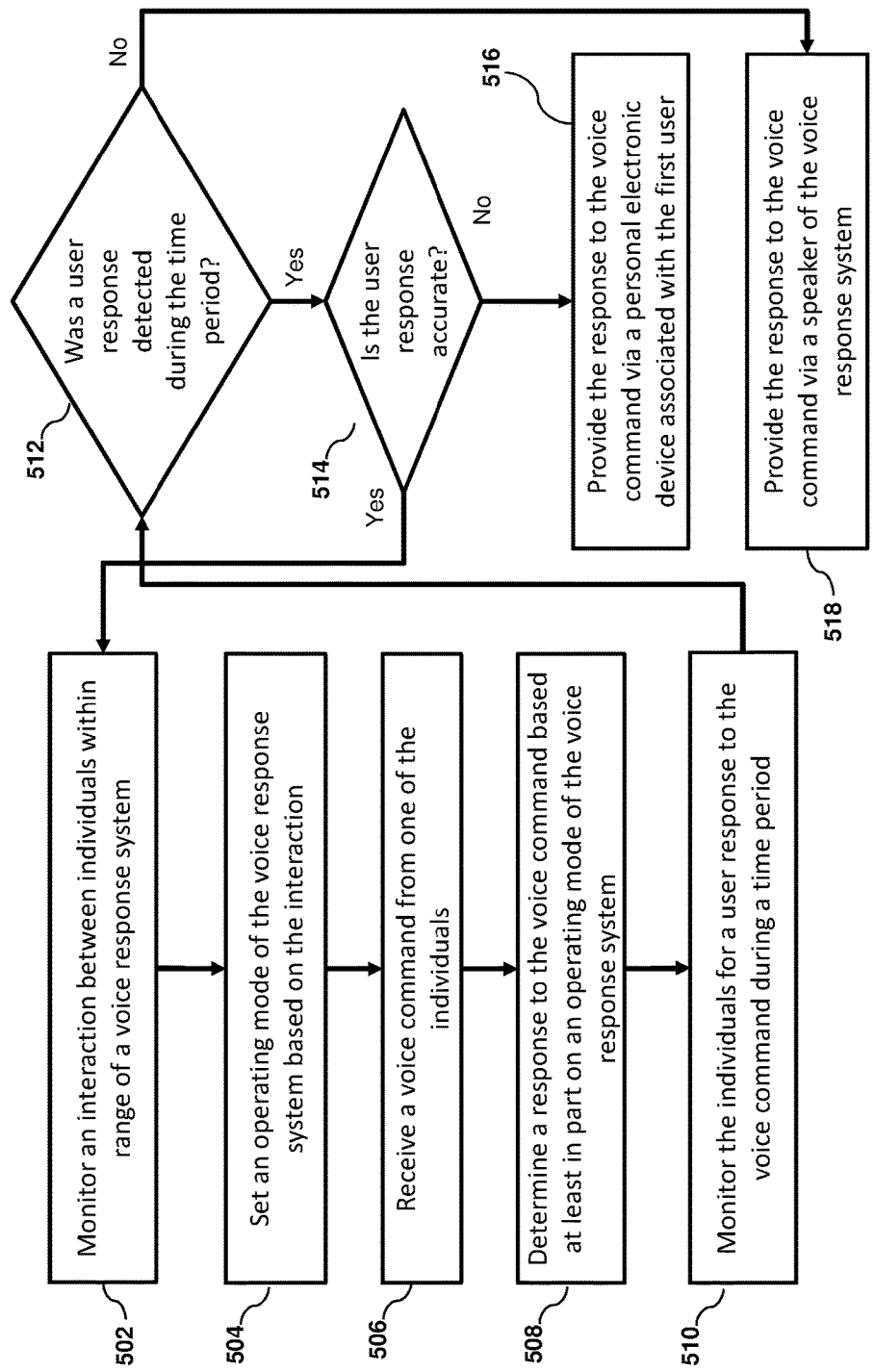
FIG. 5 depicts a flow diagram of a method for operating a voice response system according to one or more embodiments of the present invention.

Turning now to FIG. 5, a flow diagram of a method 500 for operating a voice response system in accordance with an embodiment is shown. The method 500 begins at block 502 and monitors an interaction between individuals within range of a voice response system. Next, as shown at block 504, the method 500 includes setting an operating mode of the voice response system based on the interaction. The method 500 also includes receiving a voice command from one of the individuals, as shown at block 506. Next, as shown at block 508, the method 500 includes determining a response to the voice command based at least in part on an operating mode of the voice response system.

The method 500 also includes monitoring the individuals for a user response to the voice command during a time period, as shown at block 510. In exemplary embodiments, the length of the time period is determined based on the response preferences of a user. Next, as shown at decision block 512, the method 500 includes determining if a user response detected during the time period. If a user response was not detected, the method 500 proceeds to block 518 and provides the response to the voice command via a speaker of the voice response system. If a user response was detected, the method 500 proceeds to decision block 514 and determines if the user response is accurate. If the user response is not determined to be accurate, the method 500 proceeds to block 516 and provides the response to the voice command via a personal electronic device associated with the first user. However, if the user response is determined to be accurate, the method 500 returns to block 502 and continues to monitor the interaction between the individuals.

In exemplary embodiments, the response preferences and/or the operating modes can be created using machine learning by analyzing the interaction between individuals within range of the voice response system and the reaction of the individuals to the voice response system providing a response to voice commands. In embodiments of the invention, the voice response system is configured to execute machine learning (ML) algorithms. In general, ML algorithms, in effect, extract features from received data in order to "classify" the received data. Examples of suitable classifiers include but are not limited to neural networks (described in greater detail below), support vector machines (SVMs), logistic regression, decision trees, hidden Markov Models (HMMs), etc. The end result of the classifier's operations, i.e., the "classification," is to predict a class for the data. The ML algorithms apply machine learning techniques to the received data in order to, over time, create/train/update a unique "model." The learning or training can be supervised, unsupervised, or a hybrid that includes aspects of supervised and unsupervised learning. Supervised learning is when training data is already available and classified/labeled. Unsupervised learning is when training data is not classified/labeled so must be developed through iterations of the classifier. Unsupervised learning can utilize additional learning/training methods including, for example, clustering, anomaly detection, neural networks, deep learning, and the like.

Figure 6:
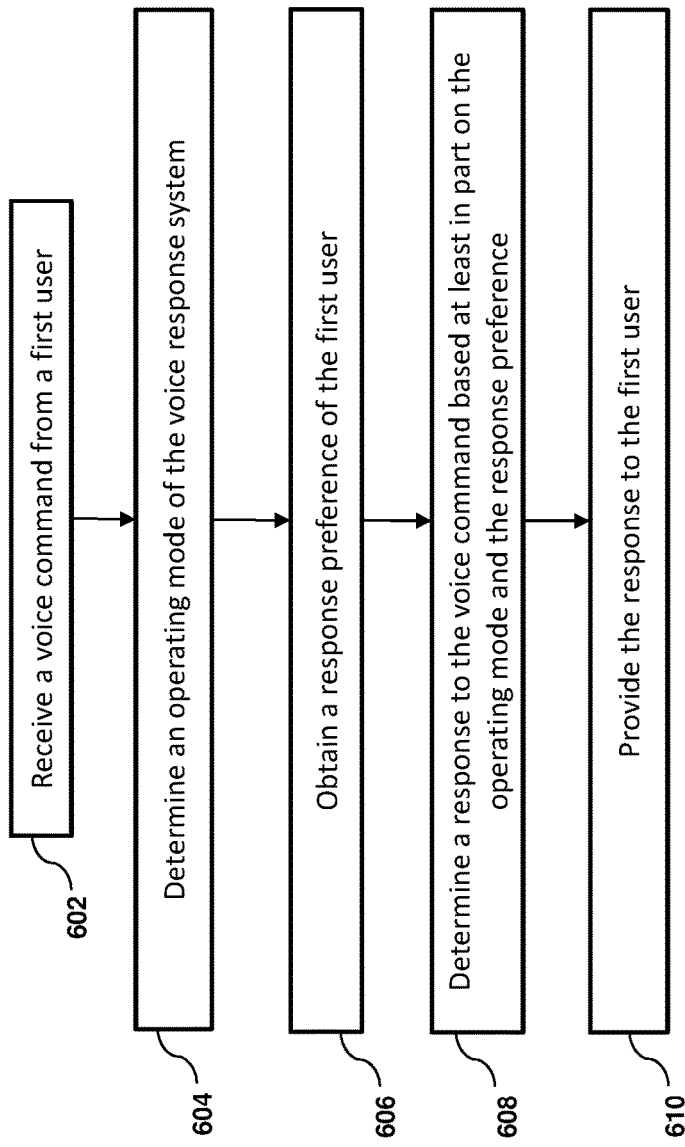
FIG. 6 depicts a flow diagram of another method for operating a voice response system according to one or more embodiments of the present invention.

Turning now to FIG. 6, a flow diagram of a method 600 for operating a voice response system in accordance with an embodiment is shown. As shown at block 602, the method 600 includes receiving, by the voice response system, a voice command from a first user. Next, as shown at block 604, the method 600 includes determining, by the voice response system, an operating mode of the voice response system. In exemplary embodiments, the operating mode of the voice response system is determined based on whether additional individuals are within range of the voice response system. The operating mode is further based upon an observed interaction between the first user and the additional individuals. In another embodiment, the operating mode of the voice response system is further determined based on an identity of the additional individuals.

As shown at block 606, the method 600 includes obtaining a response preference of the first user. Next, the method 600 includes determining a response to the voice command, wherein the response is determined based at least in part on the response preference of the first user and the operating mode of the voice response system, as shown at block 608. The method 600 concludes at block 610 by providing the response to the first user. In exemplary embodiments, method 600 includes delaying the providing of the response by a time period, the time period based on a determination that the observed interaction is a conversation between the first user and the additional individuals. The length of the time period of the delay is determined based on the response preference of the first user. In exemplary embodiments, the delay is configured to allow the other user in the conversation an opportunity to respond to the voice command, so as to make the voice response system less intrusive.

In exemplary embodiments, the method includes detecting a user response to the voice command from one of the additional individuals during the time period and determining a manner that the response is provided to the first user based on a determined accuracy of the user response. In one embodiment, the response is provided to the first user via a personal electronic device associated with the first user based on a determination that the user response is not accurate.

Technical benefits include an improved functionality of voice response systems that are able to be operated in various operating modes and that provide responses in different manners based on the operating mode of the voice response system. By allowing the user to customize the response options for the voice response systems, the utility of the voice response systems is increased.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for operating a voice response system, comprising:
   receiving, by the voice response system, a voice command from a first user;
   determining, by the voice response system, an operating mode of the voice response system;
   obtaining, by the voice response system, a response preference of the first user;
   determining, by the voice response system, a response to the voice command, wherein the response is determined based at least in part on the response preference of the first user and the operating mode of the voice response system;
   delaying the providing of the response by a time period;
   detecting, by the voice response system, a user response from a second user to the voice command during the time period;
   determining an accuracy of the user response; and
   providing the response to the first user, wherein a manner in which the response is provided to the first user is based on the accuracy of the user response from the second user,
   wherein the response is provided to the first user via one of a text message sent to a personal electronic device of the first user and an email sent to the first user personal electronic device associated with the first user based on a determination that the user response is not accurate.

2. The method of claim 1, wherein the operating mode of the voice response system is determined at least in part based on whether additional individuals are within range of the voice response system.

3. The method of claim 2, wherein the operating mode of the voice response system is further determined at least in part based on an observed interaction between the first user and the additional individuals.

4. The method of claim 3, wherein the time period is based on a determination that the observed interaction is a conversation between the first user and the additional individuals.

5. The method of claim 4, wherein a length of the time period is determined based on the response preference of the first user.

6. The method of claim 2, wherein the operating mode of the voice response system is further determined based on an identity of the additional individuals.

7. A voice response system, comprising:
a memory having computer readable instructions; and
a processor for executing the computer readable instructions, the computer readable instructions including instructions for:
receiving a voice command from a first user;
determining an operating mode of the voice response system;
obtaining a response preference of the first user;
determining a response to the voice command, wherein the response is determined based at least in part on the response preference of the first user and the operating mode of the voice response system;
delaying the providing of the response by a time period;
detecting a user response from a second user to the voice command during the time period;
determining an accuracy of the user response; and
providing the response to the first user, wherein a manner in which the response is provided to the first user is based on the accuracy of the user response from the second user,
wherein the response is provided to the first user via one of a text message sent to a personal electronic device of the first user and an email sent to the first user personal electronic device associated with the first user based on a determination that the user response is not accurate.

8. The voice response system of claim 7, wherein the operating mode of the voice response system is determined at least in part based on whether additional individuals are within range of the voice response system.

9. The voice response system of claim 8, wherein the operating mode of the voice response system is further determined at least in part based on an observed interaction between the first user and the additional individuals.

10. The system of claim 9, wherein the time period is based on a determination that the observed interaction is a conversation between the first user and the additional individuals.

11. The system of claim 10, wherein a length of the time period is determined based on the response preference of the first user.

12. The system of claim 8, wherein the operating mode of the voice response system is further determined based on an identity of the additional individuals.

13. A computer program product comprising a non-transitory computer readable storage medium having program instructions embodied therewith the program instructions executable by a computer processor to cause the computer processor to perform a method, comprising:
receiving, by a voice response system, a voice command from a first user;
determining, by the voice response system, an operating mode of the voice response system;
obtaining, by the voice response system, a response preference of the first user;
determining, by the voice response system, a response to the voice command, wherein the response is determined based at least in part on the response preference of the first user and the operating mode of the voice response system;
delaying the providing of the response by a time period;
detecting a user response from a second user to the voice command during the time period;
determining an accuracy of the user response; and
providing the response to the first user, wherein a manner in which the response is provided to the first user is based on the accuracy of the user response from the second user,
wherein the response is provided to the first user via one of a text message sent to a personal electronic device of the first user and an email sent to the first user personal electronic device associated with the first user based on a determination that the user response is not accurate.

14. The computer program product of claim 13, wherein the operating mode of the voice response system is determined at least in part based on whether additional individuals are within range of the voice response system.

15. The computer program product of claim 14, wherein the operating mode of the voice response system is further determined at least in part based on an observed interaction between the first user and the additional individuals.

16. The computer program product of claim 15, wherein the time period is based on a determination that the observed interaction is a conversation between the first user and the additional individuals.

\* \* \* \* \*